US012607059B2

(12) United States Patent
O'Neil et al.

(10) Patent No.: US 12,607,059 B2
(45) Date of Patent: Apr. 21, 2026

(54) THERMAL BARRIER

(71) Applicant: Apogee SFS US, LLC, Minneapolis, MN (US)

(72) Inventors: Jon O'Neil, Allendale, MI (US); Tim Fookes, Cedar Springs, MI (US); David Schraufnagel, Edgar, WI (US); Andy Joswiak, Elcho, WI (US)

(73) Assignee: Apogee SFS US, LLC, Minneapolis, MN (US)

( * ) Notice: Subject to any disclaimer, the term of this patent is extended or adjusted under 35 U.S.C. 154(b) by 0 days.

(21) Appl. No.: 18/458,471

(22) Filed: Aug. 30, 2023

(65) Prior Publication Data

US 2024/0076931 A1 Mar. 7, 2024

Related U.S. Application Data

(60) Provisional application No. 63/403,192, filed on Sep. 1, 2022.

(51) Int. Cl.
*E06B 3/267* (2006.01)
*E06B 3/263* (2006.01)

(52) U.S. Cl.
CPC .... *E06B 3/267* (2013.01); *E06B 2003/26354* (2013.01)

(58) Field of Classification Search
CPC ........ E06B 3/267; E06B 3/2675; E06B 3/273; E06B 3/5842; E06B 2003/26354; E06B 1/045; B21B 27/00
See application file for complete search history.

(56) References Cited

U.S. PATENT DOCUMENTS

| | | | |
|---|---|---|---|
| 4,688,366 A | 8/1987 | Schmidt | |
| 7,096,640 B1 | 8/2006 | Chevian et al. | |
| 9,068,344 B2 | 6/2015 | Mckenna | |
| 2019/0284866 A1* | 9/2019 | Marinack, Jr. | E06B 3/26305 |

OTHER PUBLICATIONS

"2" Thermal Narrow Stile Heavy Duty Offset Door, Product specification, Arcadia retrieved from https://arcadiainc.com/products/swing/ns212hdt-thermal-narrow-stile-heavy-duty/.

* cited by examiner

*Primary Examiner* — Moshe Wilensky
(74) *Attorney, Agent, or Firm* — Dorsey & Whitney LLP

(57) ABSTRACT

The present disclosure describes methods of forming thermal barriers or breaks in tubular structures configured for inclusion in a variety of construction products and building features, such as doors and windows. Methods involve using one or more connector members to couple complementary extrusion profiles, which may comprise aluminum or other conductive materials. A low-conductivity material may then be deposited directly over the connector members coupling the extrusion profiles to form thermal barriers therebetween. At least a portion of the extrusion profiles may be knurled to improve the bond strength between the low-conductivity material, which may comprise polyurethane, and the extrusion profiles. Specialized components may be unnecessary to form the thermal barriers, such that the same connector members used to couple the extrusion profiles may be used to form the thermal barriers.

12 Claims, 13 Drawing Sheets

THERMAL BARRIER

CROSS-REFERENCE TO RELATED APPLICATIONS

This application claims priority to U.S. Provisional Patent Application No. 63/403,192 filed Sep. 1, 2022, entitled "THERMAL BARRIER" which is incorporated by reference herein, in its entirety and for all purposes.

TECHNICAL FIELD

Implementations relate to thermal barrier structures and associated methods of assembly. Particular implementations include methods of manufacturing hollow tubular extrusions having at least one thermal barrier configured for inclusion in various building components, including doors and windows.

BACKGROUND

Exterior glass doors and windows are often relied on to provide temperature-resistant barriers for a variety of buildings. Despite its high conductivity, aluminum is commonly used to manufacture at least a portion of the framing for such products. As a result, a variety of thermal barrier components and systems have been designed for inclusion in framing components comprised of aluminum to compensate for its high conductivity. Many preexisting thermal barrier systems include customized components configured for insertion within or outside aluminum frame structures, examples of which include uniquely configured clips and inserts designed to couple interior and exterior aluminum extrusions. Many of such customized components are used solely during the assembly process and ultimately removed before the finished product is completed and ready for construction or sale. Various adhesives, in addition or alternatively, are used to couple aluminum extrusions to the thermal barriers coupled thereto, either before, during, or after assembly.

The present inventors recognized that customized components and adhesives are often incompatible with other components used to produce thermal barriers. The present inventors also recognized that specialized components typically require specialized manufacturing processes.

Accordingly, the present inventors recognized that improved thermal barriers are needed to enhance building insulation while also simplifying the manufacturing processes implemented to produce the barriers.

SUMMARY

The present disclosure provides methods of producing thermal barriers by pouring polyurethane directly over the connector members coupling adjacent extrusion profiles of hollow, tubular extrusions used as frame components for doors, windows, curtain walls, and other building structures.

In accordance with at least one example disclosed herein, a method of forming a thermally broken tubular extrusion having at least one thermal barrier may involve coupling two extrusion profiles by inserting at least one connector member into opposing connector cavities defined by the extrusion profiles. After coupling, the connector member and the extrusion profiles may form at least one pour cavity. The method may further involve adding polyurethane to the pour cavity to form the thermally broken tubular extrusion.

In some examples, the method may also involve knurling at least a portion of the pour cavity to improve the bond strength between the polyurethane and the extrusion profiles. In some examples, the pour cavity may include opposing hammer portions defined by the extrusion profiles. In some examples, the polyurethane may be liquid polyurethane that is poured into the pour cavity until the hammer portions defined by the extrusion profiles are covered.

In some examples, the method may further involve crimping at least a portion of the extrusion profiles against the connector member. In some examples, the connector member may not be removed after the thermally broken tubular extrusion is formed. In some examples, the connector member may not include ridges, serrations, or teeth. In some examples, the connector member may not have a hollow interior. In some examples, an external surface of the connector member, relative to the thermally broken tubular extrusion, may be substantially smooth. In some examples, the thermally broken tubular extrusion may be configured for coupling with a door, a window, or a curtain wall structure. In some examples, inserting the connector member may involve longitudinally sliding it into the opposing connector cavities. In some examples, the extrusion profiles may be comprised of aluminum.

In accordance with at least one example disclosed herein, a thermal barrier structure may include two extrusion profiles coupled via at least one connector member. The connector member may form or provide a longitudinal channel between the extrusion profiles. The thermal barrier structure may also include a pourable elastomeric material cured within the longitudinal channel.

In some examples, the pourable elastomeric material can be bound directly to a surface of the connector member. In some examples, the pourable elastomeric material may include polyurethane. In some examples, the connector member may lack serrations, teeth, hollow interiors, and flexible protrusions. In some examples, the extrusion profiles may comprise aluminum. In some examples, at least a portion of each of the extrusion profiles can include a textured surface bound to the pourable elastomeric material. In some examples, an external surface of the connector member, relative to the thermal barrier structure, may be substantially smooth. In some examples, at least a portion of each of the extrusion profiles may be crimped against the connector member.

In accordance with at least one example disclosed herein, a method of forming a thermally broken or insulated tubular extrusion having at least one thermal barrier may involve providing a first extrusion profile, the first extrusion profile having a first connector cavity and a second connector cavity, and providing a second extrusion profile, which has a third connector cavity and a fourth connector cavity. The method may also involve providing a first connector member having a first end and a second end, and providing a second connector member also having a first end and a second end. The method may further involve coupling the first extrusion profile to the second extrusion profile by inserting the first connector member into the first connector cavity and the third connector cavity, thereby forming a first pour cavity, and inserting the second connector member into the second connector cavity and the fourth connector cavity, thereby forming a second pour cavity. The method can further involve adding polyurethane to the first pour cavity and the second pour cavity. In some examples, the polyurethane may be liquid or substantially liquid, and the method can further involve allowing the liquid polyurethane to cure to form the insulated, or thermally broken, tubular extrusion.

In some examples, the method also involves knurling at least a portion of the first pour cavity and the second pour cavity to improve the bond strength between the polyurethane and the first extrusion profile and the second extrusion profile. In some examples, at least a portion of the first pour cavity can include a hammer portion defined by the first extrusion profile and a hammer portion defined by the second extrusion profile. In some examples, the polyurethane can comprise liquid polyurethane that is poured into the first pour cavity and the second pour cavity at least until the first hammer portion and the second hammer portion are covered. Examples may also involve crimping at least a portion of the first extrusion profile and the second extrusion profile against the first connector member and the second connector members.

In some examples, the first connector member and the second connector member may not be removed after the thermally broken tubular extrusion is formed. In some examples, the first connector member and the second connector member may not include ridges, serrations, or teeth. In some examples, the first connector member and the second connector member may not comprise a hollow interior. In some examples, an external surface of the first connector member and an external surface of the second connector member may be substantially smooth. In some examples, the thermally broken tubular extrusion may be configured for coupling with one or more of a door, a window, or a curtain wall structure. In some examples, inserting the first connector member and inserting the second connector member can involve longitudinally sliding the first connector member into the first connector cavity and the third connector cavity, and longitudinally sliding the second connector member into the second connector cavity and the fourth connector cavity. In some examples, the first extrusion profile and the second extrusion profile may be comprised of aluminum.

In accordance with at least one example disclosed herein, a thermal barrier structure may include a first extrusion profile coupled to a second extrusion profile via at least one connector member. The at least one connector member may form at least one longitudinal channel between the first extrusion profile and the second extrusion profile. The structure may also include a pourable elastomeric material cured within the at least one longitudinal channel.

In some examples, the pourable elastomeric material may be bound directly to a surface of the at least one connector member. In some examples, the pourable elastomeric material may include polyurethane. In some examples, the at least one connector member may lack serrations, teeth, hollow interiors, and flexible protrusions. In some examples, the first extrusion profile and the second extrusion profile may comprise aluminum. In some examples, at least a portion of the first extrusion profile and at least a portion of the second extrusion profile may comprise a textured surface bound to the pourable elastomeric material. In some examples, an external surface of the at least one connector member may be substantially smooth. In some examples, at least a portion of the first extrusion profile and the second extrusion profile may be crimped against the at least one connector member.

BRIEF DESCRIPTION OF THE DRAWINGS

The drawings illustrate generally, by way of example, but not by way of limitation, various embodiments discussed in this patent document. In the drawings.

Figure 1A:
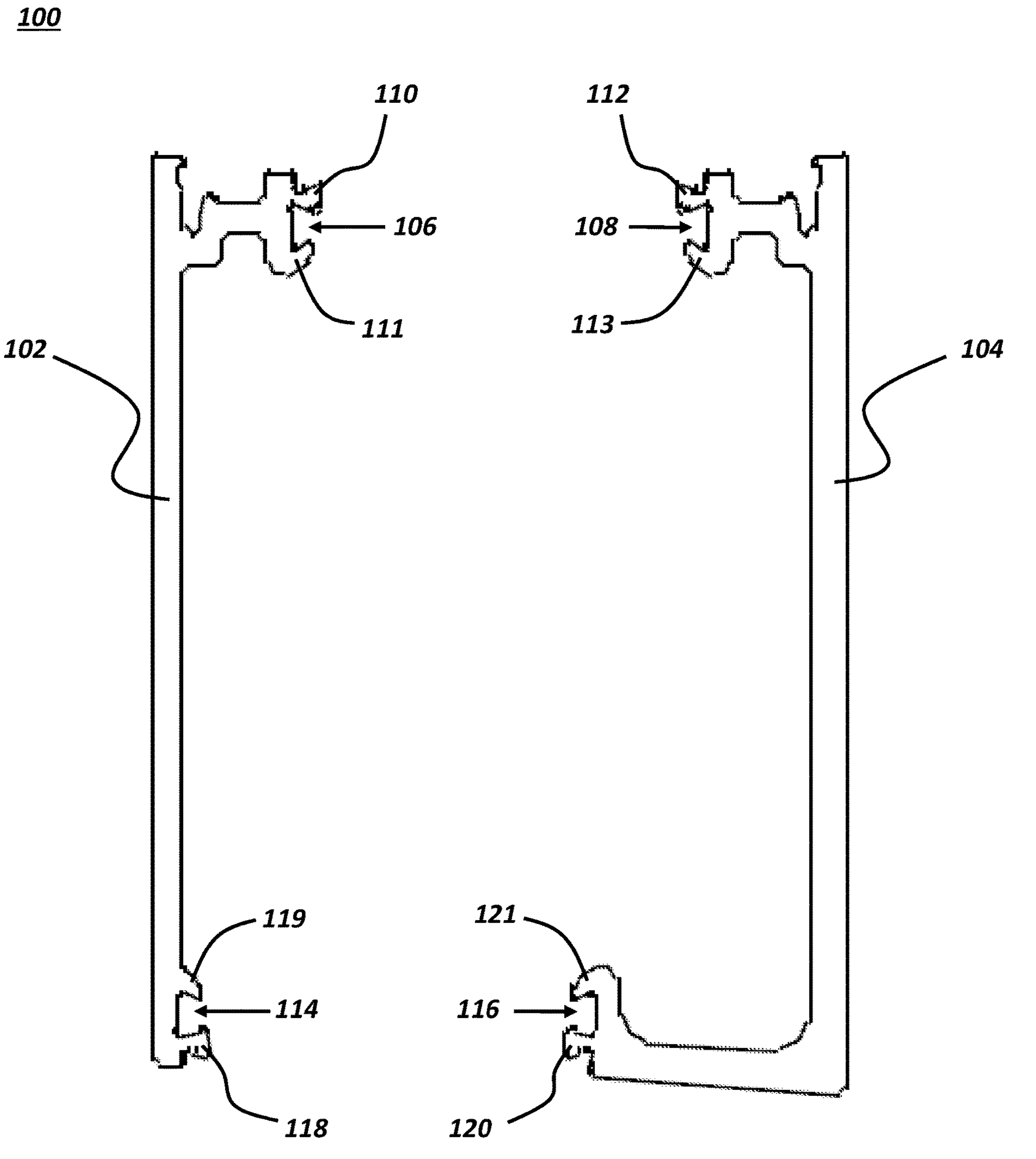
FIG. 1A is a front view of two extrusion profiles utilized to form a tubular structure having at least one thermal barrier in accordance with embodiments of the present disclosure.

The drawings are not necessarily to scale. Certain features and components may be shown exaggerated in scale or in schematic form, and some details may not be shown in the interest of clarity and conciseness.

DETAILED DESCRIPTION

The following description of certain examples is in no way intended to limit the disclosure or its applications or uses. In the following Detailed Description of examples of the present apparatuses, devices and associated methods of assembly, reference is made to the accompanying drawings which form a part hereof, and in which are shown by way of illustration specific examples in which the described embodiments may be implemented. These examples are described in sufficient detail to enable those skilled in the art to practice the presently disclosed embodiments, and it is to be understood that other examples may be utilized and that structural or procedural changes may be made without departing from the spirit and scope of the present disclosure. Moreover, for the purpose of clarity, detailed descriptions of certain features will not be discussed when they would be apparent to those skilled in the art so as not to obscure the description of the present disclosure. The following detailed description is therefore not to be taken in a limiting sense, and the scope of the present systems and methods is defined only by the appended claims.

Provided herein are methods of forming thermal barriers or breaks in tubular structures configured for inclusion in a variety of construction products and building features, non-limiting examples of which may include framing components for windows, doors, and curtain wall structures, including the mullions, rails, sills, jambs, hinges, and headers that may form components thereof. The building features may be exterior-facing and thus exposed to a wide range of temperatures and weather conditions. For ease of illustration, the terms "tubular structures," "extrusion products," "tubular extrusions," and "hollow tubular extrusions" may be used interchangeably herein to refer to tubular structures having at least one thermal barrier. While extruded components are described, the present disclosure is not limited to extrusions, as one or more components of the tubular structures may be formed by processes that do not involve extrusion.

Embodiments may feature two or more extrusion profiles joined by at least one thermal barrier or break, which may comprise non-extruded products including at least one connector member and a pourable material. The disclosed connector members, which may be referred to herein as "connector components," "connector inserts," or simply "connectors" for ease of illustration, may comprise thermal inserts, struts, bridges, clips, strips, or other structural couplings or links. The connector members may be generally elongate in shape such that the length of each connector member is greater than its width, although the dimensions of the connector members may vary. The present disclosure is also not limited to tubular components, and may instead feature one or more non-tubular structures, e.g., panels, coupled using one or more connector members and a low-conductivity material.

The tubular structures disclosed herein may exhibit enhanced, energy-efficient thermal performance while also requiring few, if any, specialized components. By adding a material having low conductivity directly onto the connector members coupling separate extrusion profiles of moderate to high conductivity, the disclosed methods of forming tubular structures may be simpler than preexisting methods used to form similar products. The bond strength between the low-conductivity, pourable material and the extrusion profiles may be increased by knurling at least a portion of the extrusion profiles. The connector members may provide a permanent component of the cavities configured to receive the pourable material, such that the connector members remain in the final tubular structures containing at least one thermal barrier.

Referring to the drawings, FIGS. 1A-1D show the sequential steps that may be implemented pursuant to a method 100 of forming an enclosed tubular structure having at least one thermal barrier in accordance with the disclosed embodiments. FIG. 1A shows an initial step that involves providing a first extrusion profile 102 and a second extrusion profile 104, one or both of which can comprise aluminum. After assembly, the first extrusion profile 102 can constitute an exterior-facing component of a building structure, and the second extrusion profile 104 can constitute an interior-facing component, or vice-versa.

The first extrusion profile 102 defines a first connector cavity 106 and the second extrusion profile 104 defines a second connector cavity 108, mirroring or otherwise opposing the first. Each connector cavity 106, 108 is configured to receive at least a portion of a connector member or structural insert. A first hammer portion 110 is also defined by the first extrusion profile 102, and a second hammer portion 112 is defined by the second extrusion profile 104. The hammer portions 110, 112 may face or oppose each other upon alignment of the first and second extrusion profiles 102, 104 during an assembly process. The hammer portions 110, 112 are configured to receive a mechanical force during an optional crimping process, as further described below, which may bend or otherwise deform the hammer portions 110, 112 from an original configuration to a modified configuration. A first anvil portion 111 and a second anvil portion 113 further define the first and second connector cavities 106, 108, respectively.

Opposite the first and second connector cavities 106, 108 are a third connector cavity 114 and a fourth connector cavity 116 defined by the first and second extrusion profiles 102, 104, respectively. A third hammer portion 118 and a fourth hammer portion 120 further define the third and fourth connector cavities 114, 116, as do a third anvil portion 119 and a fourth anvil portion 121.

Positioning the first and second extrusion profiles 102, 104 in the manner shown aligns the connector cavities 106, 108, 114, 116 in the manner necessary to insert complementary connector members therein and couple the extrusion profiles 102, 104 together. In addition to or instead of aluminum, the extrusion profiles 102, 104 can comprise one or more additional metals, alloys, polymers, rolled steel, or mixtures thereof. The material(s) of the extrusion profiles 102, 104 may vary depending on the end use of the final tubular product, for example as door or window components, and/or the temperatures and weather conditions to which the extrusion profiles are exposed. One or more of the process steps and/or structures disclosed herein may be modified to accommodate other materials. For example, the knurling process disclosed herein may be omitted in favor of a different texturizing process, or adjusted such that the mechanical pressure applied by the knurling wheel(s) is decreased for less rigid materials. The material of the connector members may also be changed to couple different extrusion materials, as can the low-conductivity material and/or size of the thermal cavities.

Figure 1B:
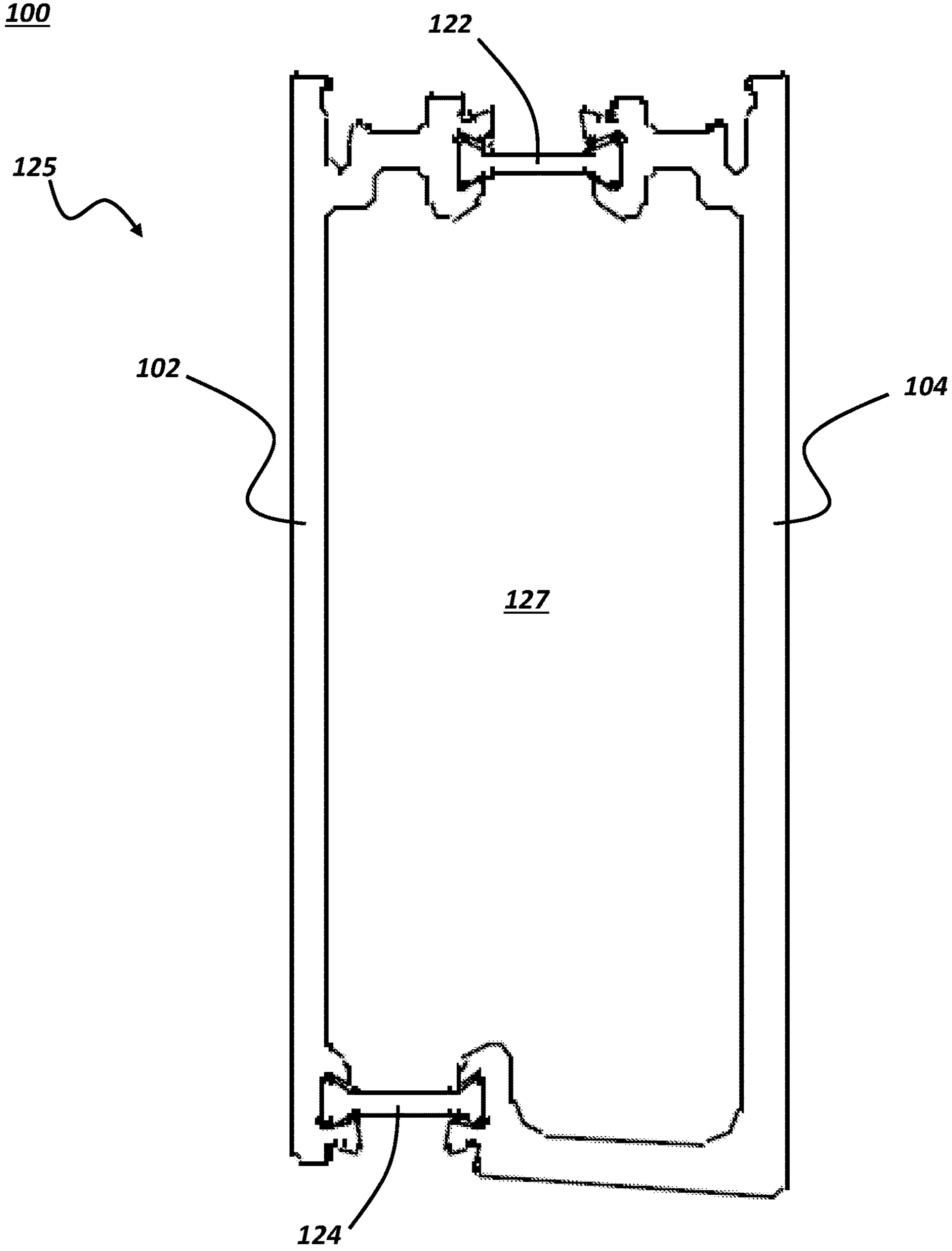
FIG. 1B is a front view of the extrusion profiles shown in FIG. 1A coupled together via two connector members in accordance with embodiments of the present disclosure.

As shown in FIG. 1B, the extrusion profiles 102, 104 can be aligned and subsequently coupled via one or more connector members or strips, which may be made of any suitable material, non-limiting examples of which may include polyamide, nylon, fiberglass, PVC, or combinations thereof, along with additional polymeric or wooden structures, to form a tubular structure. The illustrated embodiment includes a first connector member 122 and a second connector member 124. Opposite end portions of the first connector member 122 can be inserted into the first connector cavity 106 and the opposing second connector cavity 108, thereby linking the first extrusion profile 102 to the second extrusion profile 104. Opposite end portions of the second connector member 124 can likewise be inserted into the third and fourth connector cavities 114, 116, further linking the extrusion profiles 102, 104 and forming an enclosed tubular structure 125 defining a hollow interior 127. Insertion of both connector members 122, 124 into their respective connector cavities 106, 108, 114, 116 can complete at least a preliminary coupling of the extrusion profiles 102, 104. Connector insertion and positioning may involve sliding the connector members 122, 124 longitudinally (into and out of the page) within their respective connector cavities, which may act as rail structures defined by the extrusion profiles 102, 104. Together with the opposing hammer portions 110, 112, 118, 120, each inserted connector member 122, 124 may define a longitudinal channel configured to receive a pourable elastomeric material of low conductivity, which may be liquid or viscous upon pouring, such as liquid polyurethane. In addition to or instead of polyurethane, a variety of other low-conductivity materials may be added to the longitudinal channel, such as a variety of thermoplastics. Solid or semi-solid materials, which may be relatively malleable or flexible, may also be added to the longitudinal channel, for example by depositing or pressing such materials into the longitudinal channel without pouring. Accordingly, while pouring a liquid material, such as polyurethane, may be preferred, additional materials can be poured or otherwise added to cavities defined by the extrusion profiles and connector members.

Figure 1C:
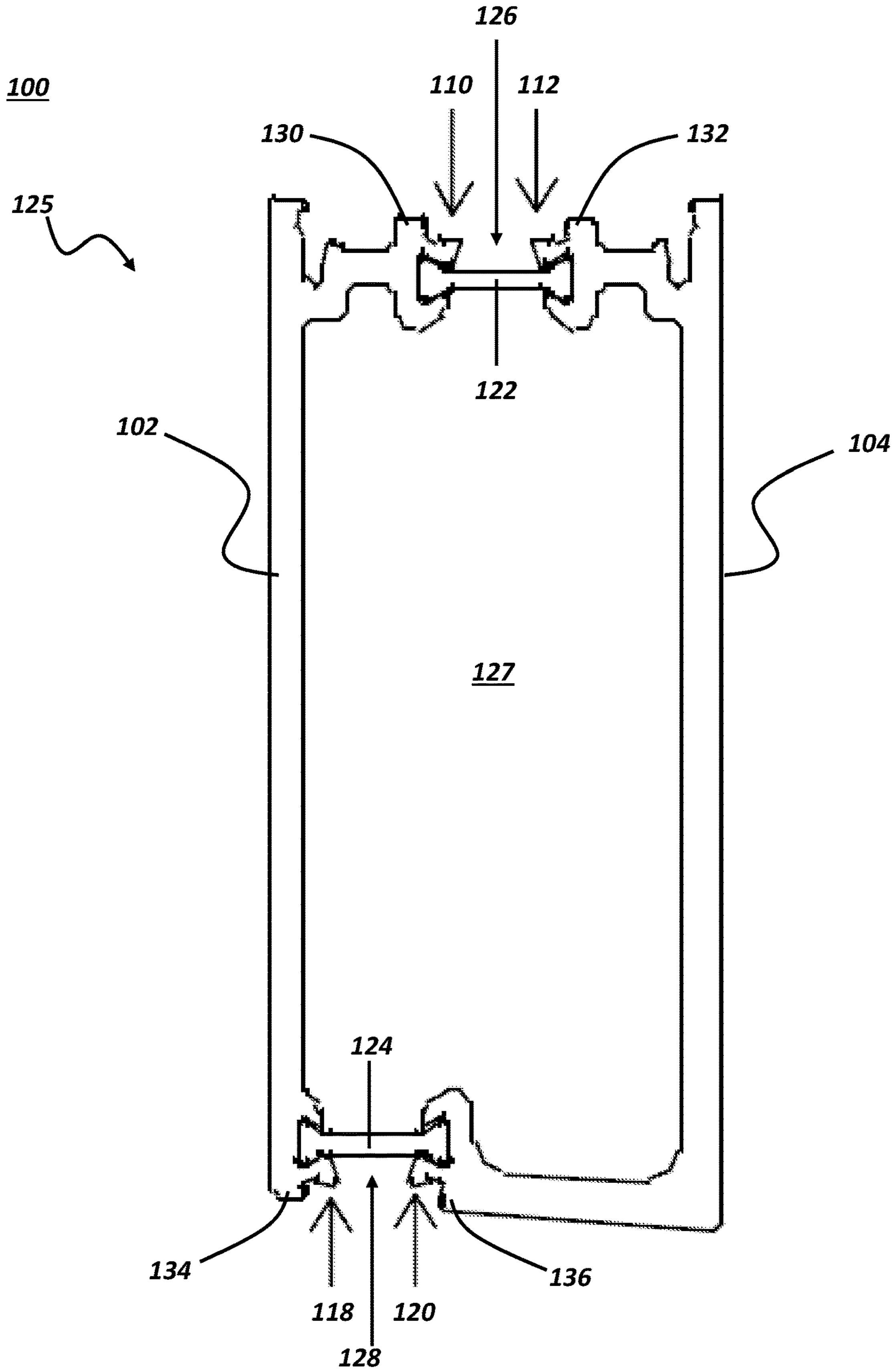
FIG. 1C is a front view of the extrusion profiles and connector members shown in FIG. 1B after crimping a portion of the extrusion profiles around the connector members in accordance with embodiments of the present disclosure.
Figure 1D:
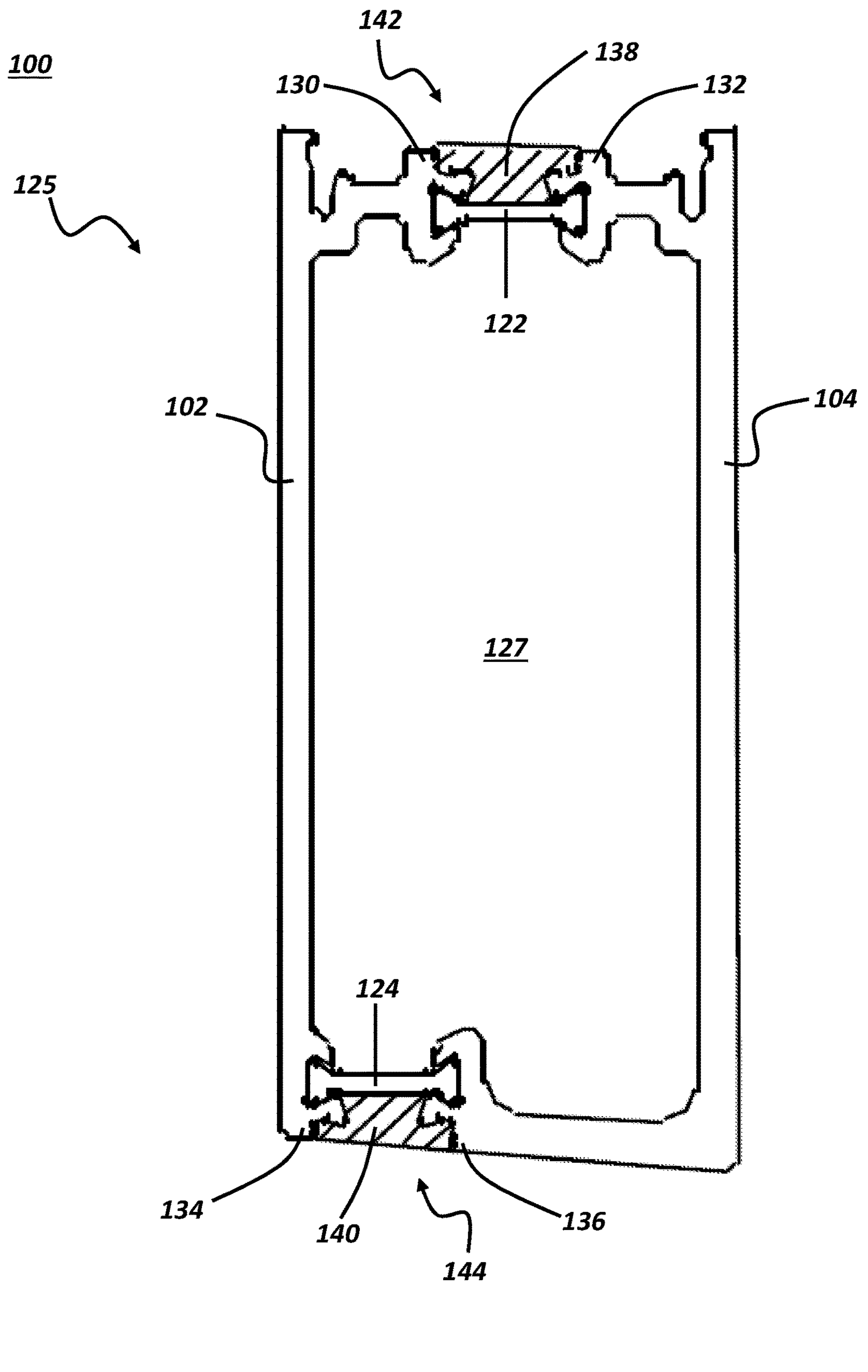
FIG. 1D is a front view of the extrusion profiles and connector members shown in FIG. 1C after adding polyurethane into the cavities formed by the extrusion profiles and connector members.

The connector members can be subsequently secured or locked in place by crimping the hammer portions defining each connector cavity. As shown in FIG. 1C, for instance, the first and second hammer portions 110, 112 can be crimped against the first connector member 122, toward the hollow interior 127 (in the direction of the arrows), and the second and third hammer portions 118, 120 can be crimped against the second connector member 124, again toward the hollow interior 127. Crimping may involve applying mechanical pressure to the hammer portions using an industrial roller apparatus, for example. The extent of crimping may vary. For example, each hammer portion may be crimped toward an inserted connector member by about 1 mm, 2 mm, 3 mm, or more, or any distance therebetween. Inserting mandrels or other components within the hollow interior 127 may be unnecessary to support the extrusion profiles 102, 104 during the crimping process in some embodiments. In some examples, crimping may not be used. According to such examples, the extrusion profiles may be snap-fit or secured to each connector member via one or more detents, for instance.

The secured connector members 122, 124, together with opposing hammer portions 110, 112, 118, 120 of the extrusion profiles 102, 104, define pour cavities 126, 128 configured to receive a pourable material of low conductivity. As shown, pour cavity 126 is defined by the outer surface of the first connector member 122 (relative to the hollow interior 127) and the first and second hammer portions 110, 112, along with a first terminal protrusion 130 defined by the first extrusion profile 102, and a second terminal protrusion 132 defined by the second extrusion profile 104. Pour cavity 128 is similarly defined at the opposite side of the tubular structure 125 by the outer surface of the second connector member 124, and the third and fourth hammer portions 118, 120, along with a third terminal protrusion 134 defined by the first extrusion profile 102, and a fourth terminal protrusion 136 defined by the second extrusion profile 104. The pour cavities 126, 128 may extend longitudinally along the length of the extrusion profiles 102, 104, such that the low-conductivity pourable material can be interposed between the extrusion profiles 102, 104 without leaving conductive gaps therebetween. In some examples, the terminal protrusions 130, 132, 134, 136 defining each pour cavity 126, 128 may be enlarged to increase size of the pour cavities and thus the surface area available for bonding of the pourable material. As noted above, alternative embodiments may feature materials having low conductivity that are not liquid or pourable. Accordingly, the pour cavities may simply comprise cavities configured to receive the low-conductivity materials.

With the connector members secured and the extrusion profiles firmly coupled, the pourable material can be poured into the pour cavities 126, 128. In the example shown in FIG. 1D, the pourable material comprises polyurethane, such that a first polyurethane filler 138 is poured into the first pour cavity 126, and a second polyurethane filler 140 is poured into the second thermal cavity 128, thereby forming a first thermal barrier or break 142 and a second thermal barrier or break 144, respectively. The polyurethane fill level may be equal or substantially equal to the height of the terminal protrusions 130, 132, 134, 136, such that the hammer portions 110, 112, 118, 120 are completely covered and concealed. After pouring, the polyurethane fillers 138, 140 may be allowed to cure and harden. The pouring step may be performed along a pour line separate or operatively coupled with the machinery used to couple and/or crimp the extrusion profiles 102, 104.

The illustrated tubular structure 125 includes thermal barriers 142, 144 on opposite sides of the structure. The thermal barriers 142, 144 reduce the conductivity of the structure as a whole by interrupting the high conductivity of the extrusion profiles 102, 104. As a result, the temperature exposed to the exterior-facing extrusion profile 102 or 104 may not be transferred to the interior-facing extrusion profile 102, 104, such that high and low temperatures, in particular, may not be transferred to the interior of the building incorporating the tubular structure 125. Unlike preexisting approaches, the polyurethane can be deposited directly onto the connector members 122, 124, which can then remain in place after the polyurethane has cured. Each connector member may thus provide a polyurethane substrate and fixed thermal backer for each thermal barrier 142, 144. Pouring the polyurethane onto the connector members may significantly strengthen the bond between the extrusion profiles 102, 104 and the connector members 122, 124, which may also enhance the strength of the thermal barriers 142, 144 included in the tubular structure 125.

The pour cavities 126, 128 can be filled in any order, and the tubular structure 125 can be inverted between pours to facilitate the filling process. While polyurethane is disclosed as the filler material in connection with FIG. 1D, other elastomeric materials of medium to low conductivity may be used. The use of pourable polyurethane may increase the flexibility of the manufacturing process by widening the process window.

In some embodiments, one or more steps shown in FIGS. 1A-1D can be performed without customized components or machinery. One or both connector members 122, 124, for example, can be the same or similar to connector members used to couple preexisting extrusion profiles during the assembly of other tubular structures. Specialized retainer components, bridges, or clips, which may include or define barbs, teeth, serrations, and/or flanges, may not be necessary to form the thermal cavities or snap the extrusion profiles together. Consequently, such specialized retainer components may be excluded from embodiments disclosed herein. The use of adhesives and/or additional structural reinforcements before or after the final tubular structure is assembled may also be unnecessary and excluded from embodiments disclosed herein. The surface area of each connector member, alone, may be sufficient for polyurethane bonding and durable thermal cavity formation. In some examples, the connector members may have a substantially smooth surface and may have a body resembling the shape of a bone, with enlarged end portions flaring outward from a straight or substantially straight elongate middle portion having an approximately constant cross-sectional width. The low conductivity of the resulting tubular structures described herein was surprising given the small number of components required for assembly and the relative simplicity of the assembly process.

The number of thermal barriers featured in a given tubular structure may vary depending on numerous factors, non-limiting examples of which may include the configuration of the extrusion profiles and/or the thermal protection needed for a particular building fenestration product. Embodiments may include one thermal barrier, two thermal barriers, three thermal barrier, four thermal barriers, or more. The position of the thermal barriers within a tubular extrusion may also vary. In the example shown in FIGS. 1A-1D, the thermal barriers 142, 144 are included within opposite sides of the tubular structure 125. Additional embodiments, such as those comprised of corner mullions, may include thermal barriers positioned within adjacent sides of a tubular structure. The tubular extrusion may be approximately rectangular, as shown, and may provide a component of a window frame member, a door frame, a curtain wall grid or frame, etc. Additional examples may not be rectangular, and may feature more than two extrusion profiles or other structural components having a moderate to high conductivity, e.g., solid aluminum panels.

The width of each thermal barrier 142, 144, which may be equal or substantially equal to the width of each connector member 122, 124, may vary, ranging from about 0.1 inches to about 0.2 inches, 0.3 inches, 0.4 inches, 0.5 inches, 0.6 inches, 0.7 inches, 0.8 inches, 0.9 inches, 1.0 inches, 1.1 inches, 1.2 inches, 1.3 inches, 1.4 inches, 1.5 inches, 1.6 inches, 1.7 inches, 1.8 inches, 1.9 inches, 2.0 inches or more, or any width therebetween.

Figure 2A:
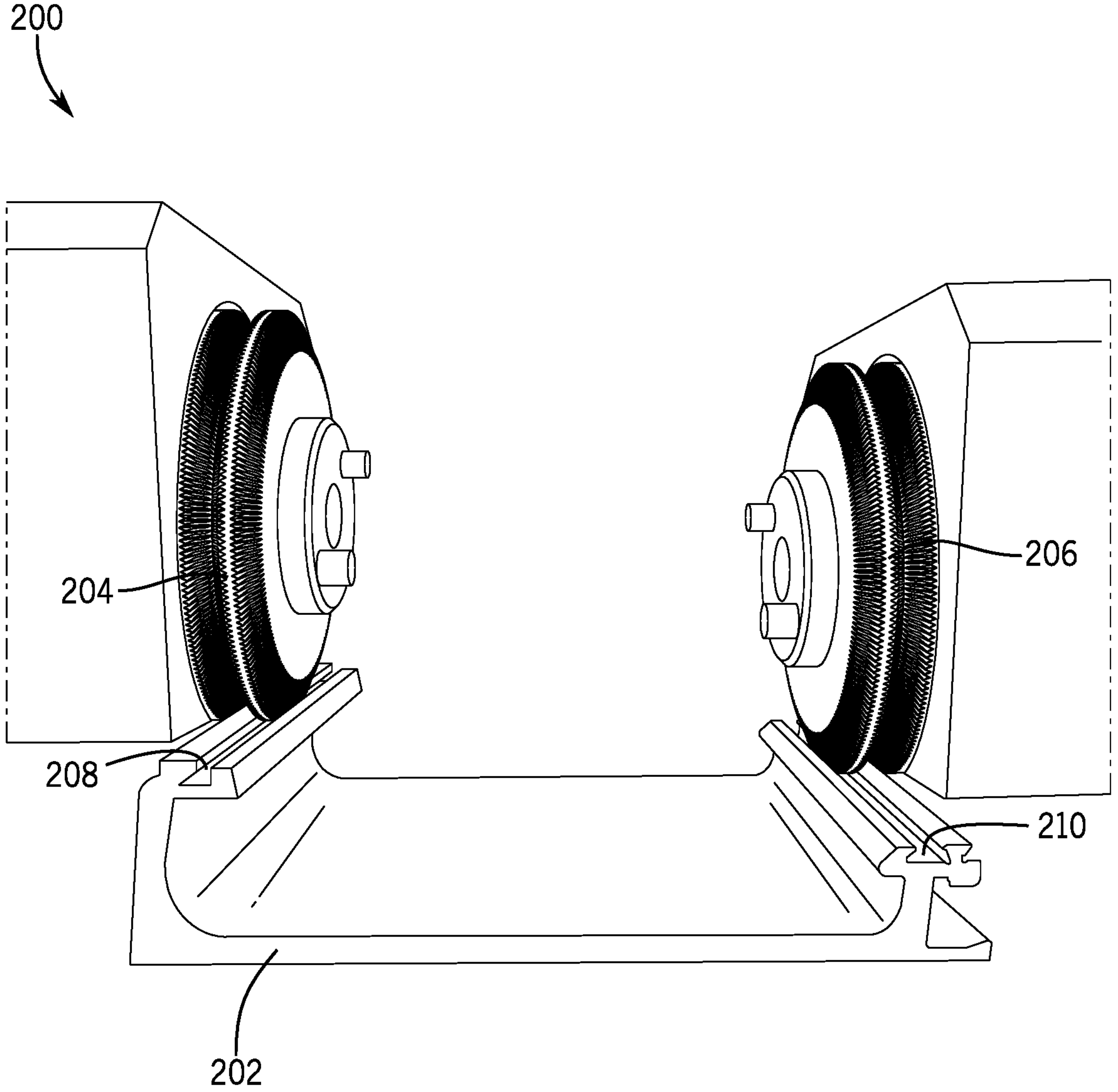
FIG. 2A is a view of a knurling apparatus engaged with an extrusion profile in accordance with embodiments of the present disclosure.

In some embodiments, at least a portion of one or both extrusion profiles 102, 104 may be knurled before the pouring process to improve the bond strength between the polyurethane and the extrusion profiles, as well as the connection between the extrusion profiles and the connector members. Knurling may generally involve cutting, embossing or otherwise imprinting a texture into a surface of the extrusion profiles. Other processes used to texturize the surface of the extrusion profiles may also be implemented. FIG. 2A shows a knurling apparatus 200 engaged with an extrusion profile 202 according to such embodiments. The knurling apparatus 200 includes a first knurling wheel 204 and a second knurling wheel 206 configured to apply a down-pressure onto the extrusion profile 202. The first knurling wheel 204 is positioned over the first connector cavity 208 of the extrusion profile 202, and the second knurling wheel 206 is positioned over the second connector cavity 210.

Figure 2B:
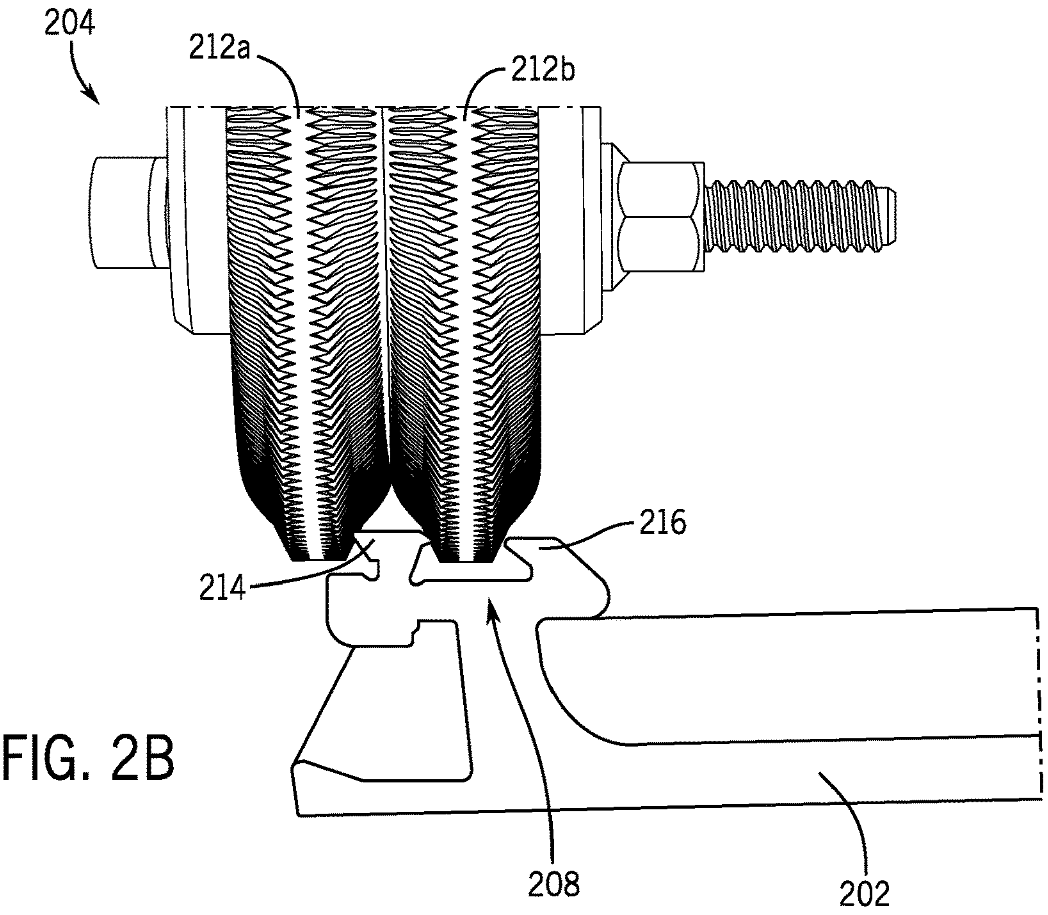
FIG. 2B is a view of one of the knurling wheels shown in FIG. 2A engaged with a connector cavity of the extrusion profile.

FIG. 2B provides a magnified view of the first knurling wheel 204 engaged with the first connector cavity 208 after lowering the knurling apparatus 200 onto the extrusion profile 202. As shown, the first knurling wheel 204 includes two knurling discs 212*a*, 212*b* together configured to ride on both sides of the hammer portion 214. Each knurling disc 212*a*, 212*b* defines a textured surface configured to knurl hammer portion 214 and anvil portion 216 of extrusion profile 202, respectively. While the particular kneel texture and depth thereof may vary, embodiments may involve introducing a relatively deep and/or sharp kneel to at least a portion of the extrusion profile 202, e.g., both sides of the hammer portion 214, to increase the bond strength between the polyurethane and the pour cavity.

Figure 2C:
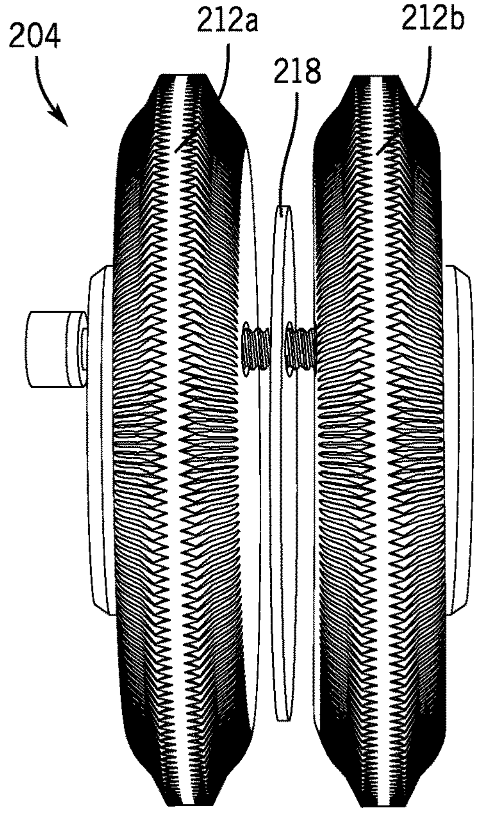
FIG. 2C is an exploded view of the knurling wheel shown in FIG. 2B.

FIG. 2C shows a loosened configuration of the first knurling wheel 204, which further includes a spacer disc 218 separating the knurling discs 212*a*, 212*b*. Spacer discs having different cross-sectional thicknesses can be used to accommodate differently sized connector cavities and hammer portions. For small connector cavities, a spacer may not be necessary. During the knurling process, the outside knurling disc 212*a* may contact the outside of the connector cavity defined by the hammer portion 214. The knurling discs 212*a*, 212*b* may ride on both sides of the hammer portion 214. A heavy knurl may be introduced to both sides of the hammer portion 214, while a less pronounced, moderate knurl may be introduced to the anvil portion 216. The knurl introduced on the outside of the hammer portion 214 may mechanically lock the polyurethane in place, while the knurl introduced within the connector cavity may further secure the connector member therein.

Figure 3A:
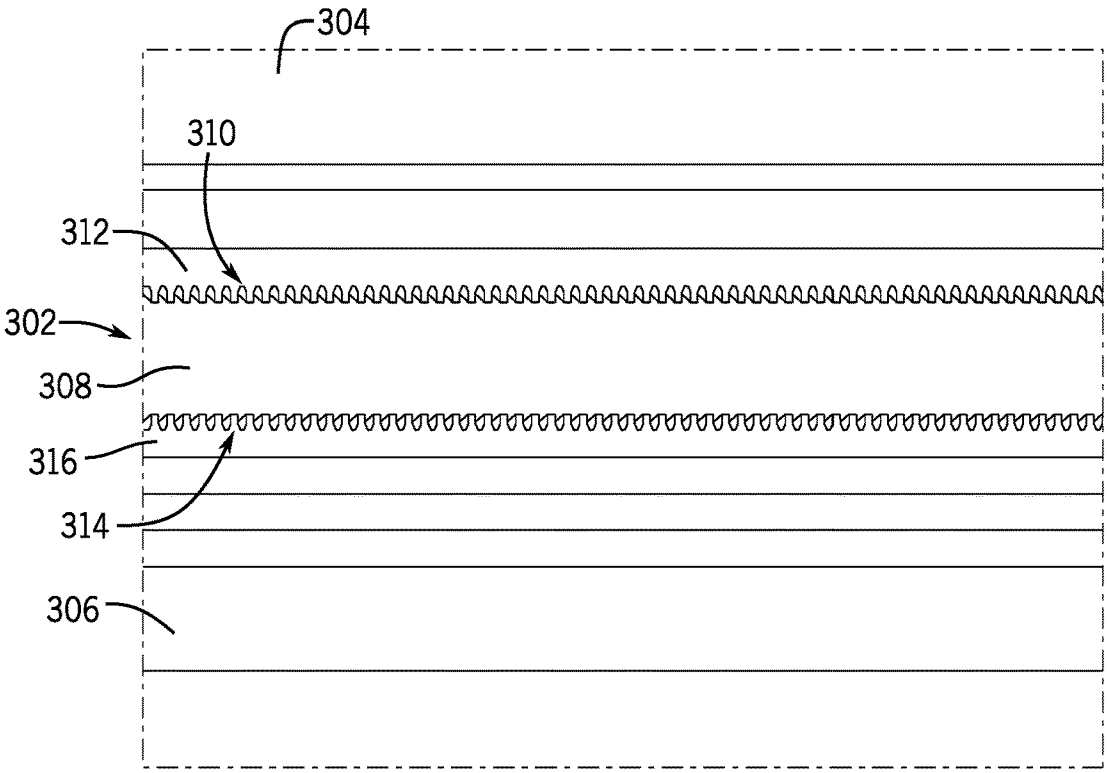
FIG. 3A is a top view of a cavity after knurling complementary extrusion profiles in accordance with embodiments disclosed herein.
Figure 3B:
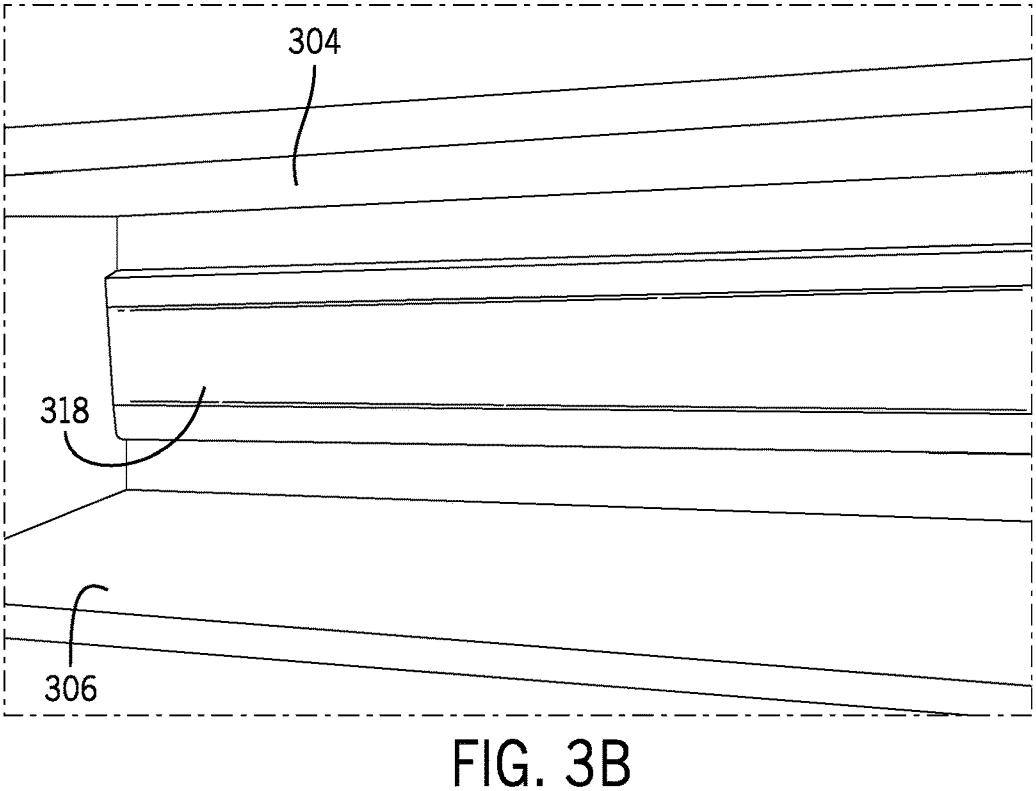
FIG. 3B is a top view of the cavity shown in FIG. 3A after filling the cavity with polyurethane.

FIG. 3A shows a pour cavity 302 formed after coupling a first extrusion profile 304 to a second extrusion profile 306 using a connector member 308. The knurled surface 310 of the hammer portion 312 of the first extrusion profile 304 is shown, positioned opposite the knurled surface 314 of the hammer portion 316 of the second extrusion profile 306. After pouring, the polyurethane 318 may completely cover at least the knurled hammer portions, evenly filling the pour cavity to form a thermal barrier, as shown in FIG. 3B.

Figure 4A:
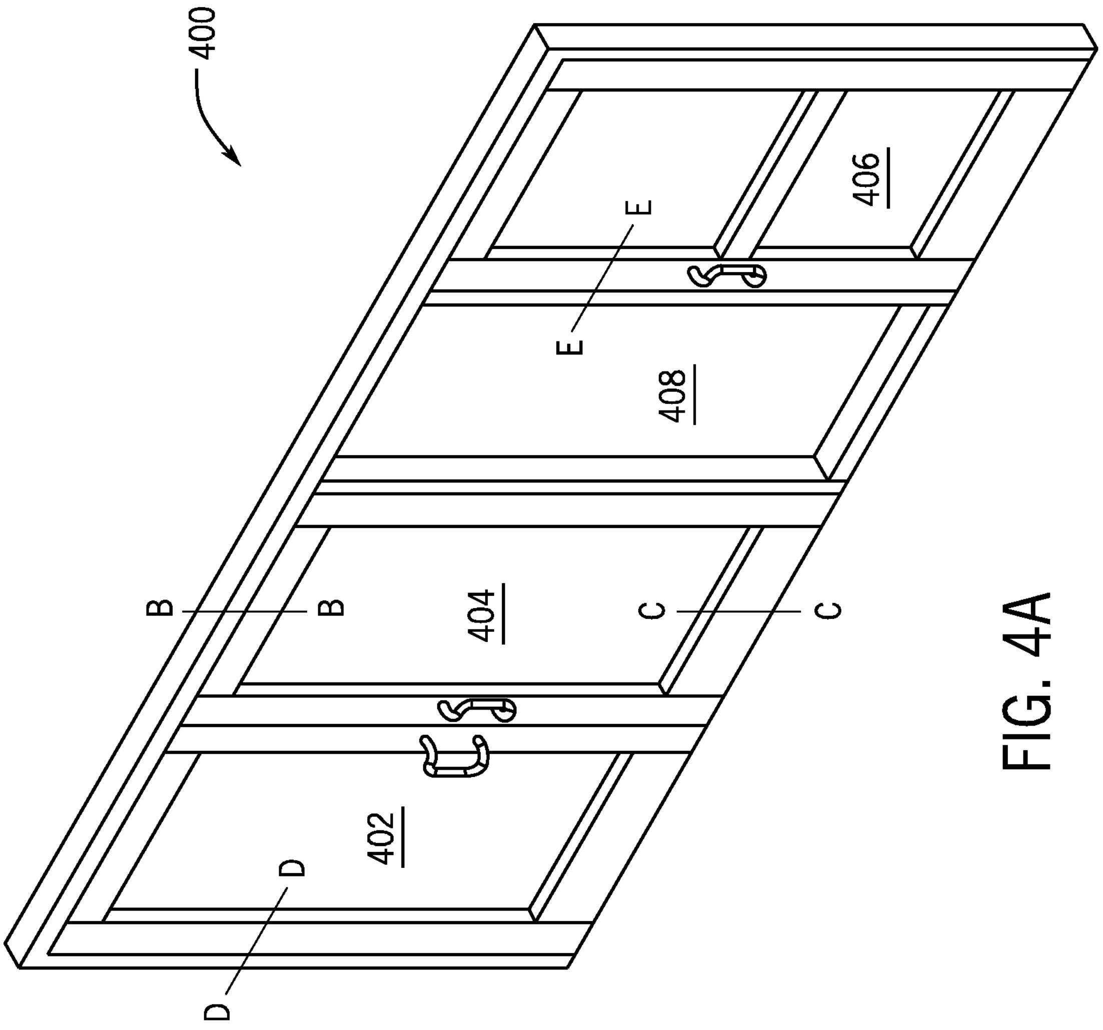
FIG. 4A is an elevation view of a doorway in accordance with embodiments disclosed herein.

As noted above, the tubular structures disclosed herein can be coupled or fixed to one or more components of a door, window, curtain wall, etc. FIG. 4A shows a doorway 400, which may constitute a building entrance, that incorporates the tubular structures disclosed herein. Additional doorways or entryways may also be constructed using the tubular structures described herein, which may or may not include windows and/or doors, and may not be exterior-facing. The tubular structures can be included in, coupled with, or constitute multiple components of the doorway or a perimeter portion thereof, non-limiting examples of which may include a header structure, bottom rail, jamb structure, lock stile, lock rail, hinge stile, and/or top rail. The doorway 400 includes a first glass door 402, a second glass door 404, a third glass door 406, and a glass window 408.

Figure 4B:
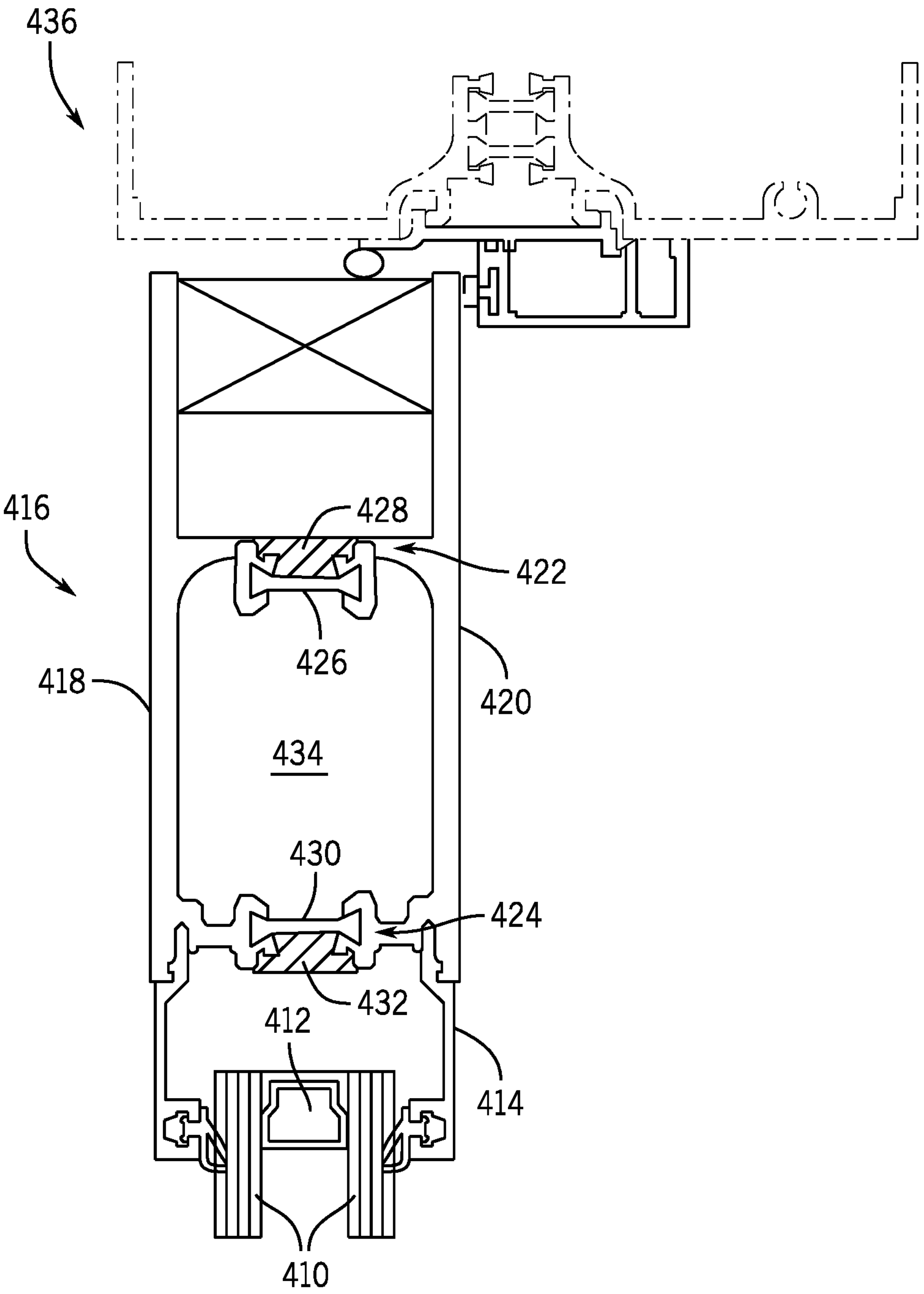
FIG. 4B is a cross-sectional view of the doorway taken along line B-B of FIG. 4A.

FIG. 4B illustrates a cross-sectional view of the top of the second door 404 taken along line B-B of FIG. 4A. The door 404 includes two glass panels 410 separated by a spacer unit 412. Coupled to the glass panels 410 via a framing component 414 is a tubular structure 416 comprised of a first extrusion profile 418 and a second extrusion profile 420, with a first thermal barrier 422 and a second thermal barrier 424 positioned therebetween. The first thermal barrier 422 includes a first connector member 426 and a first polyurethane fill 428, and the second thermal barrier 424 similarly includes a second connector member 430 and a second polyurethane fill 432. The tubular structure 416 defines a hollow interior 434 and is coupled to a frame header 436 of the second door 404. The first extrusion profile 418 may face the interior of the doorway 400, and the second extrusion profile 420 may face the exterior. The thermal barriers 422, 424 are positioned to interrupt the high conductivity of the extrusion profiles 418, 420, which may comprise aluminum, such that the interior of the building remains a substantially constant temperature.

Figure 4C:
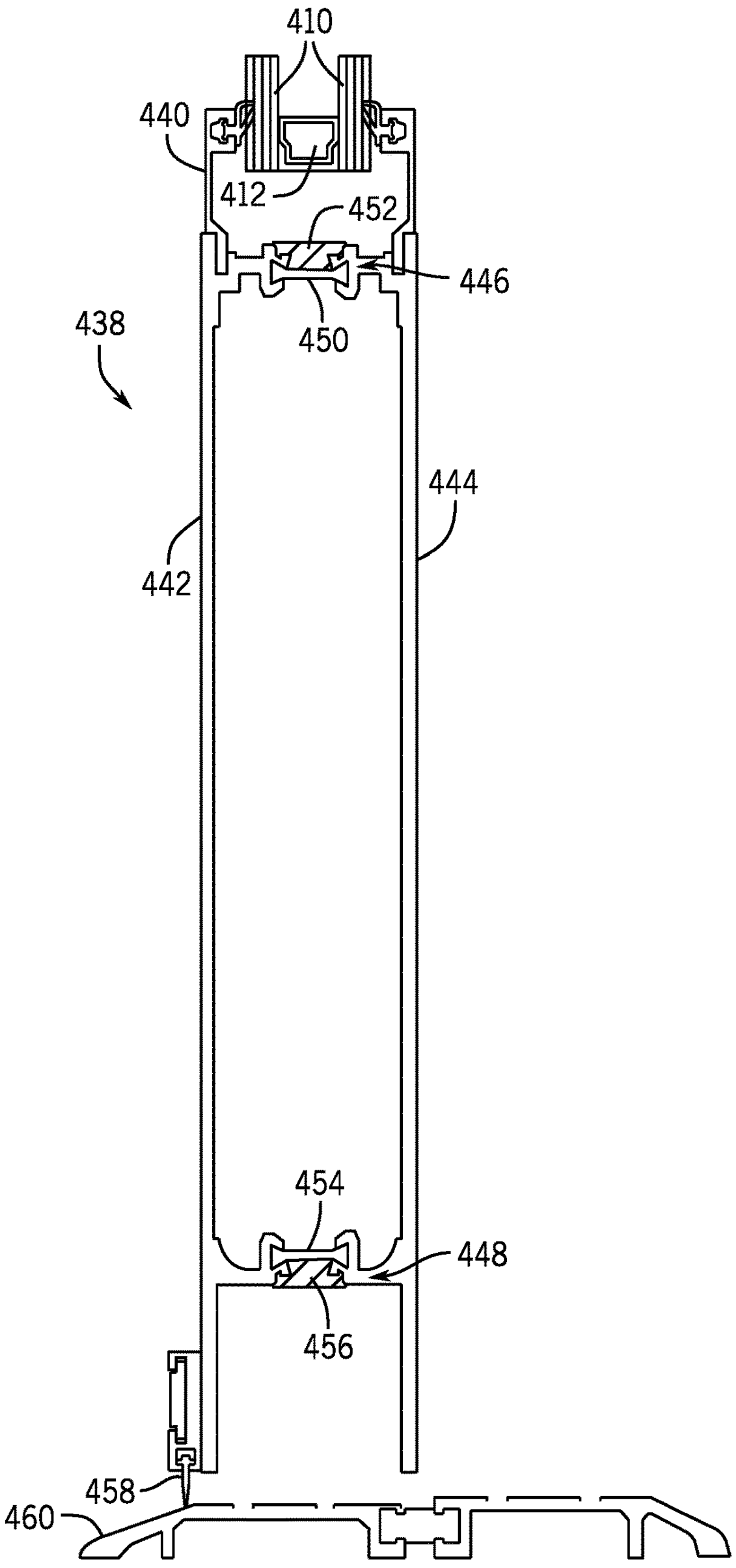
FIG. 4C is a cross-sectional view of the doorway taken along line C-C of FIG. 4A.

FIG. 4C illustrates a cross-sectional view of the second door 404 taken along line C-C of FIG. 4A, showing the bottom of the second door 404. A lower tubular structure 438 is coupled to the glass panels 410 and spacer unit 412 via a sill framing component 440. The tubular structure 438 includes a first extrusion profile 442 and a second extrusion profile 444 connected via a first thermal barrier 446 and a second thermal barrier 448. The first thermal barrier 446 includes a first connector member 450 and a first polyurethane filler 452, and the second thermal barrier 448 includes a second connector member 454 and a second polyurethane filler 456. Below the lower tubular extrusion 438, a door sweep 458 contacts a lower threshold 460.

Figure 4D:
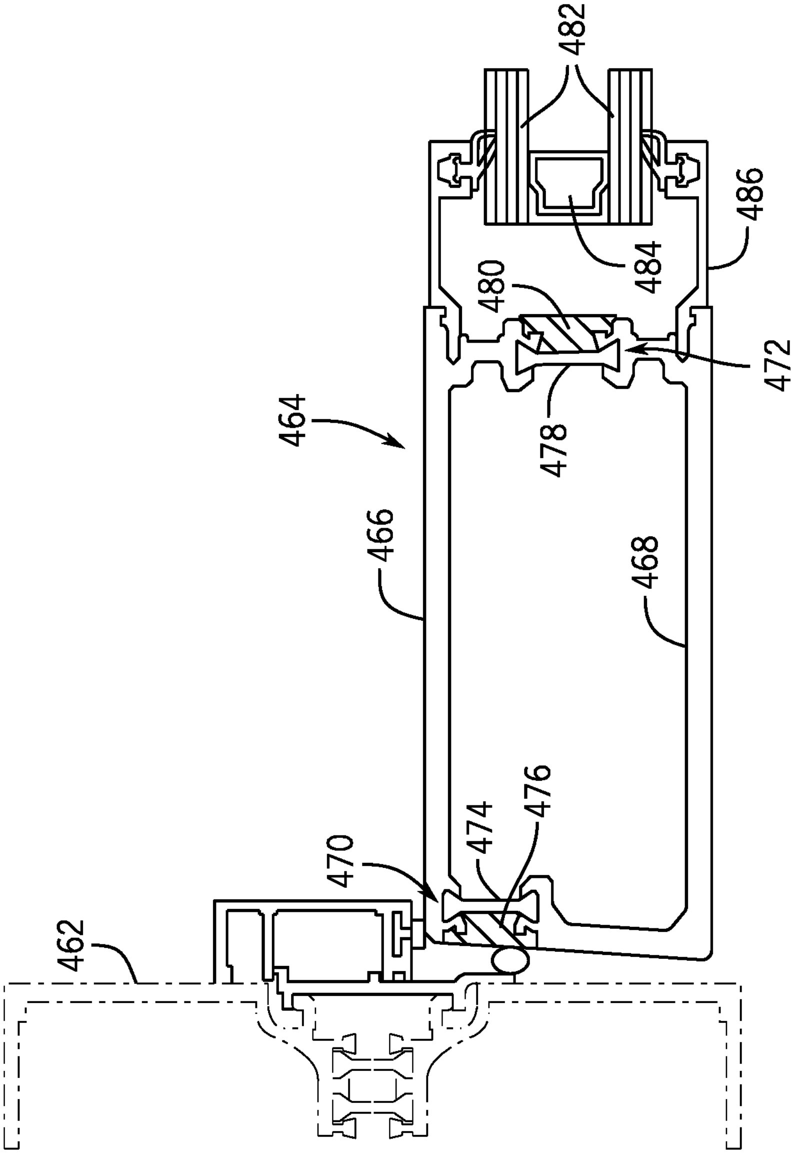
FIG. 4D is a cross-sectional view of the doorway taken along lines D-D and E-E of FIG. 4A.

FIG. 4D illustrates a cross-sectional view of the first door 402 and the third door 406 taken along lines D-D and E-E of FIG. 4A. A side jamb 462 is shown, coupled to another tubular structure 464 featuring a first extrusion profile 466 and second extrusion profile 468 connected via a first thermal barrier 470 and a second thermal barrier 472. The first thermal barrier 470 includes a first connector member 474 and a first polyurethane filler 476, and the second thermal barrier 472 includes a second connector member 478 and a second polyurethane filler 480. The tubular structure 464 is coupled with two glass panels 482 separated by a spacer unit 484 via a framing component 486.

Figure 5A:
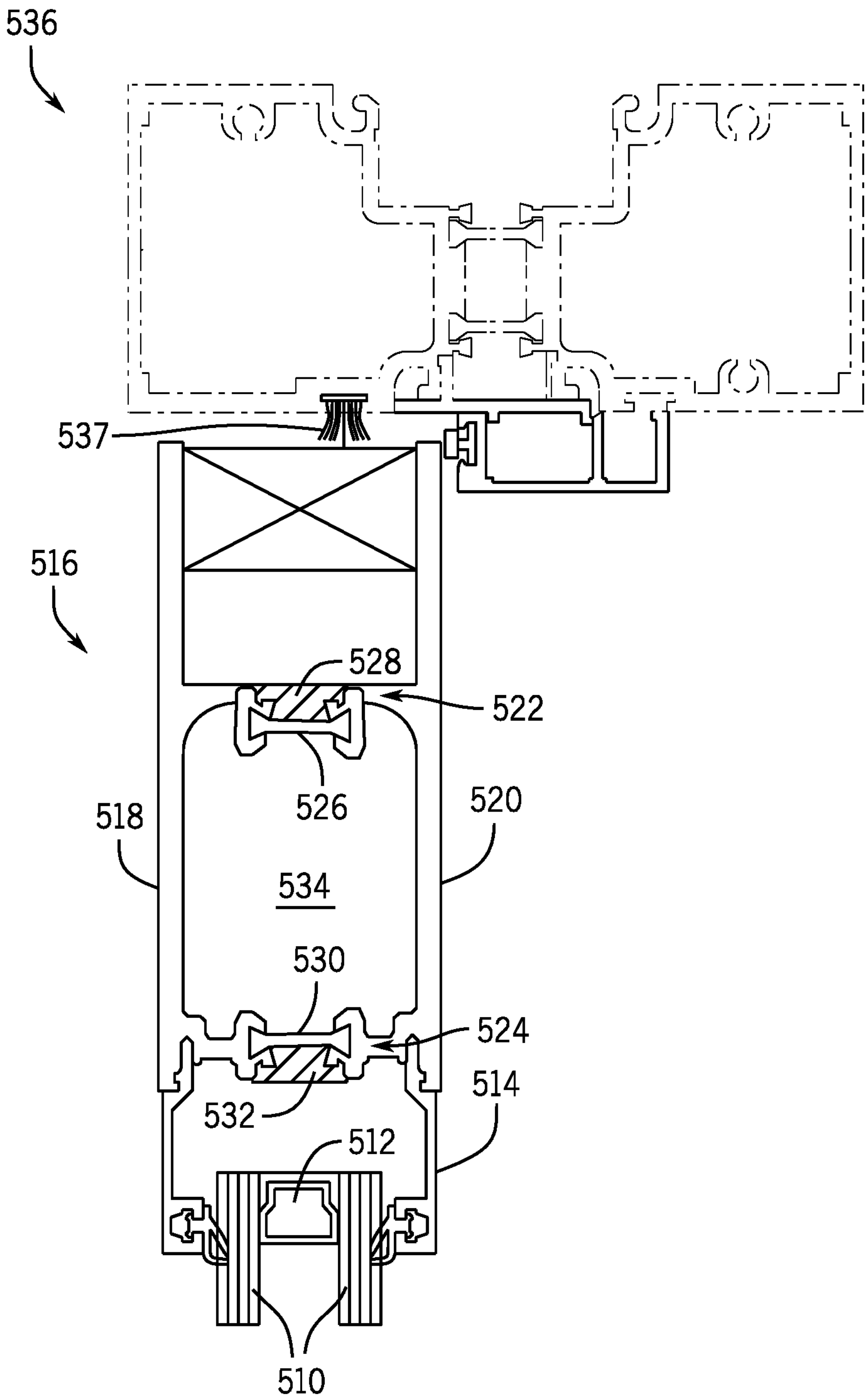
FIG. 5A is a cross-sectional view of another embodiment of the doorway shown in FIG. 4A, taken along line B-B.

FIG. 5A illustrates a cross-sectional view of the top of a slightly different embodiment of the second door 404 taken along line B-B of FIG. 4A. As shown, two glass panels 510 are separated by a spacer unit 512. Coupled to the glass panels 510 via a framing component 514 is a tubular structure 516 comprised of a first extrusion profile 518 and a second extrusion profile 520, with a first thermal barrier 522 and a second thermal barrier 524 positioned therebetween. The first thermal barrier 522 includes a first connector member 526 and a first polyurethane fill 528, and the second thermal barrier 524 similarly includes a second connector member 530 and a second polyurethane fill 532. The tubular structure 516 defines a hollow interior 534 and is coupled to a frame header 536 of the door. A door pile weatherseal 537 is positioned between the frame header 536 and the tubular structure 516, where the seal 537 may enhance the thermal properties of the design by blocking cold air from reaching the back extrusion. Embodiments may also omit the weatherseal 537. The first extrusion profile 518 may face the interior of the doorway, and the second extrusion profile 520 may face the exterior. The thermal barriers 522, 524 are positioned to interrupt the high conductivity of the extrusion profiles 518, 520, which may comprise aluminum, such that the interior of the building remains a substantially constant temperature.

Figure 5B:
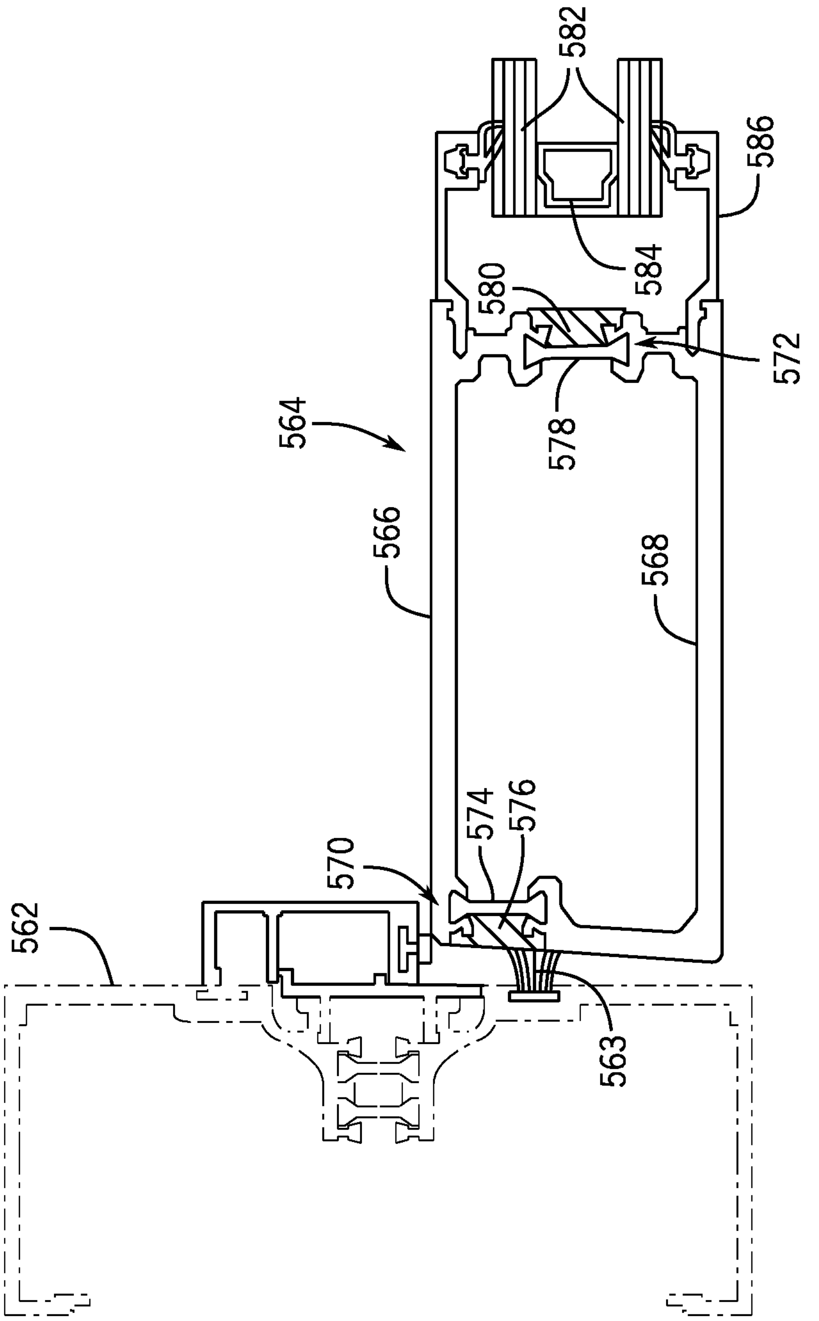
FIG. 5B is a cross-sectional view of another embodiment of the doorway shown in FIG. 4A, taken along lines D-D and E-E.

FIG. 5B illustrates a cross-sectional view of slightly different embodiments of the first door 402 and the third door 406 taken along lines D-D and E-E of FIG. 4A. A side jamb 562 is shown, and is coupled to another tubular structure 564 featuring a first extrusion profile 566 and second extrusion profile 568 connected via a first thermal barrier 570 and a second thermal barrier 572. A door pile weatherseal 563 is positioned between the frame header side jamb 562 and the tubular structure 564, where the seal 563 may enhance the thermal properties of the design by blocking cold air from reaching the back extrusion. Embodiments may omit the weatherseal 563. The first thermal barrier 570 includes a first connector member 574 and a first polyurethane filler 576, and the second thermal barrier 572 includes a second connector member 578 and a second polyurethane filler 580. The tubular structure 564 is coupled with two glass panels 582 separated by a spacer unit 584 via a framing component 586.

EXAMPLES

In Example 1, a method involves providing a first extrusion profile, the first extrusion profile having a first connector cavity and a second connector cavity; providing a second extrusion profile, the second extrusion profile having a third connector cavity and a fourth connector cavity; providing a first connector member having a first end and a second end; providing a second connector member having a first end and a second end; coupling the first extrusion profile to the second extrusion profile by: inserting the first connector member into the first connector cavity and the third connector cavity, thereby forming a first pour cavity; and inserting the second connector member into the second connector cavity and the fourth connector cavity, thereby forming a second pour cavity; and adding polyurethane into the first pour cavity and the second pour cavity. The polyurethane may be liquid or viscous. According to such examples, the method can further involve allowing the polyurethane to cure to form an insulated, or thermally broken, tubular extrusion.

In Example 2, the method of Example 1 can optionally be configured such that the method further involves knurling at least a portion of the first pour cavity and the second pour cavity to improve the bond strength between the polyurethane and the first extrusion profile and the second extrusion profile.

In Example 3, the method of any one of Examples 1 or 2 can optionally be configured such that at least a portion of the first pour cavity comprises a hammer portion defined by the first extrusion profile and a hammer portion defined by the second extrusion profile.

In Example 4, the method of any one or any combination of Examples 1-3 can optionally be configured such that the polyurethane comprises liquid polyurethane that is poured into the first pour cavity and the second pour cavity at least until the first hammer portion and the second hammer portion are covered.

In Example 5, the method of any one or any combination of Examples 1-4 can optionally be configured such that the method further involves crimping at least a portion of the first extrusion profile and the second extrusion profile against the first connector member and the second connector member.

In Example 6, the method of any one or any combination of Examples 1-5 can optionally be configured such that the first connector member and the second connector member are not removed after the thermally broken tubular extrusion is formed.

In Example 7, the method of any one or any combination of Examples 1-6 can optionally be configured such that the first connector member and the second connector member do not include ridges, serrations, or teeth.

In Example 8, the method of any one or any combination of Examples 1-7 can optionally be configured such that the first connector member and the second connector member do not comprise hollow interiors.

In Example 9, the method of any one or any combination of Examples 1-8 can optionally be configured such that an external surface of the first connector member and an external surface of the second connector member are substantially smooth.

In Example 10, the method of any one or any combination of Examples 1-9 can optionally be configured such that the thermally broken tubular extrusion is configured for coupling with one or more of a door, a window, or a curtain wall structure.

In Example 11, the method of any one or any combination of Examples 1-10 can optionally be configured such that inserting the first connector member and inserting the second connector member comprises longitudinally sliding the first connector member into the first connector cavity and the third connector cavity, and longitudinally sliding the second connector member into the second connector cavity and the fourth connector cavity.

In Example 12, the method of any one or any combination of Examples 1-11 can optionally be configured such that the first extrusion profile and the second extrusion profile are comprised of aluminum.

In Example 13, a thermal barrier structure includes a first extrusion profile coupled to a second extrusion profile via at least one connector member, wherein the at least one connector member forms at least one longitudinal channel between the first extrusion profile and the second extrusion profile; and a pourable elastomeric material cured within the at least one longitudinal channel.

In Example 14, the thermal barrier structure of Example 13 can optionally be configured such that the pourable elastomeric material is bound directly to a surface of the at least one connector member.

In Example 15, the thermal barrier structure of Example 13 or 14 can optionally be configured such that the pourable elastomeric material comprises polyurethane.

In Example 16, the thermal barrier structure of any one or any combination of Examples 13-15 can optionally be configured such that the at least one connector member lacks serrations, teeth, hollow interiors, and flexible protrusions.

In Example 17, the thermal barrier structure of any one or any combination of Examples 13-16 can optionally be configured such that the first extrusion profile and the second extrusion profile comprise aluminum.

In Example 18, the thermal barrier structure of any one or any combination of Examples 13-17 can optionally be configured such that at least a portion of the first extrusion profile and at least a portion of the second extrusion profile comprise a textured surface bound to the polyurethane.

In Example 19, the thermal barrier structure of any one or any combination of Examples 13-18 can optionally be configured such that an external surface of the at least one connector member is substantially smooth.

In Example 20, the thermal barrier structure of any one or any combination of Examples 13-19 can optionally be configured such that at least a portion of the first extrusion profile and the second extrusion profile is crimped against the at least one connector member.

In Example 21, a method involves coupling two extrusion profiles by inserting at least one connector member into opposing connector cavities defined by the extrusion profiles, wherein after coupling, the at least one connector member and the extrusion profiles form at least one pour cavity. The method further involves adding polyurethane to the at least one pour cavity to form a thermally broken tubular extrusion.

In Example 22, the method of Example 21 can optionally be configured such that the method further involves knurling at least a portion of the at least one pour cavity to improve the bond strength between the polyurethane and extrusion profiles.

In Example 23, the method of Example 22 can optionally be configured such that at least one pour cavity comprises opposing hammer portions defined by the extrusion profiles.

In Example 24, the method of any one or any combination of Examples 21-23 can optionally be configured such that the polyurethane comprises liquid polyurethane that is poured into the at least one pour cavity until the hammer portions defined by the extrusion profiles are covered.

In Example 25, the method of any one or any combination of Examples 21-24 can optionally be configured to further involve crimping at least a portion of the extrusion profiles against the at least one connector member.

In Example 26, the method of any one or any combination of Examples 21-25 can optionally be configured such that the at least one connector member is not removed after the thermally broken tubular extrusion is formed.

In Example 27, the method of any one or any combination of Examples 21-26 can optionally be configured such that the at least one connector member does not include ridges, serrations, or teeth.

In Example 28, the method of any one or any combination of Examples 21-27 can optionally be configured such that the at least one connector member does not comprise a hollow interior.

In Example 29, the method of any one or any combination of Examples 21-28 can optionally be configured such that an external surface of the at least one connector member, relative to the thermally broken tubular extrusion, is substantially smooth.

In Example 30, the method of any one or any combination of Examples 21-29 can optionally be configured such that the thermally broken tubular extrusion is configured for coupling with one or more of a door, a window, or a curtain wall structure.

In Example 31, the method of any one or any combination of Examples 21-30 can optionally be configured such that inserting the at least one connector member comprises longitudinally sliding the at least one connector member into the opposing connector cavities.

In Example 32, the method of any one or any combination of Examples 21-31 can optionally be configured such that the extrusion profiles are comprised of aluminum.

In Example 33, a thermal barrier structure includes two extrusion profiles coupled via at least one connector member, wherein the at least one connector member forms a longitudinal channel between the extrusion profiles. The thermal barrier structure also includes a pourable elastomeric material cured within the longitudinal channel.

In Example 34, the thermal barrier structure of Example 33 is configured such that the pourable elastomeric material is bound directly to a surface of the at least one connector member.

In Example 35, the thermal barrier structure of Example 33 or 34 can optionally be configured such that the pourable elastomeric material comprises polyurethane.

In Example 36, the thermal barrier structure of any one or any combination of Examples 33-35 can optionally be configured such that the at least one connector member lacks serrations, teeth, hollow interiors, and flexible protrusions.

In Example 37, the thermal barrier structure of any one or any combination of Examples 33-36 can optionally be configured such that the extrusion profiles comprise aluminum. In Example 38, the thermal barrier structure of any one or any combination of Examples 33-37 can optionally be configured such that at least a portion of each of the extrusion profiles comprises a textured surface bound to the pourable elastomeric material.

In Example 39, the thermal barrier structure of any one or any combination of Examples 33-38 can optionally be configured such that an external surface of the at least one connector member, relative to the thermal barrier structure, is substantially smooth.

In Example 40, the thermal barrier structure of any one or any combination of Examples 33-39 can optionally be configured such that at least a portion of each of the extrusion profiles is crimped against the at least one connector member.

Although the present disclosure provides references to preferred embodiments, persons skilled in the art will recognize that changes may be made in form and detail without departing from the spirit and scope of the invention. The Detailed Description should be read with reference to the drawings. The drawings show, by way of illustration, specific embodiments of the present thermal barrier structures and related methods of production. These embodiments are also referred to herein as “examples.”

Certain terms are used throughout this patent document to refer to particular features or components. As one skilled in the art will appreciate, different people may refer to the same feature or component by different names. This patent document does not intend to distinguish between components or features that differ in name but not in function. For the following defined terms, certain definitions shall be applied unless a different definition is given elsewhere in this patent document. The terms “a,” “an,” and “the” are used to include one or more than one, independent of any other instances or usages of “at least one” or “one or more.” The term “or” is used to refer to a nonexclusive or, such that “A or B” includes “A but not B,” “B but not A,” and “A and B.” All numeric values are assumed to be modified by the term “about,” whether or not explicitly indicated. The term “about” refers to a range of numbers that one of skill in the art considers equivalent to the recited value (i.e., having the same function or result). In many instances, the term “about” can include numbers that are rounded to the nearest significant figure. The recitation of numerical ranges by endpoints includes all numbers and sub-ranges within and bounding that range (e.g., 1 to 4 includes 1, 1.5, 1.75, 2, 2.3, 2.6, 2.9, etc. and 1 to 1.5, 1 to 2, 1 to 3, 2 to 3.5, 2 to 4, 3 to 4, etc.).

What is claimed is:

1. A method comprising:

coupling two extrusion profiles by inserting at least one connector member into opposing connector cavities defined by the extrusion profiles, wherein after coupling, the at least one connector member and the extrusion profiles together form a tubular structure defining a hollow interior and at least one pour cavity, wherein inserting the at least one connector member comprises longitudinally sliding the at least one connector member into the opposing connector cavities; and adding polyurethane to the at least one pour cavity to form a thermally broken tubular extrusion, wherein the at least one connector member comprises enlarged end portions flaring outward from a straight, elongate middle portion having an approximately constant cross-sectional width, wherein the at least one pour cavity comprises terminal protrusions that defined exterior surfaces of the extrusion profiles, and wherein terminal tips of the terminal protrusions define a maximum cross-sectional width of the at least one pour cavity.

2. The method of claim 1, further comprising knurling at least a portion of the at least one pour cavity to improve the bond strength between the polyurethane and extrusion profiles.

3. The method of claim 2, wherein the at least one pour cavity further comprises opposing hammer portions defined by the extrusion profiles.

4. The method of claim 3, wherein the polyurethane comprises liquid polyurethane that is poured into the at least one pour cavity until the hammer portions defined by the extrusion profiles are covered.

5. The method of claim 1, further comprising crimping at least a portion of the extrusion profiles against the at least one connector member.

6. The method of claim 1, wherein the at least one connector member is not removed after the thermally broken tubular extrusion is formed.

7. The method of claim 1, wherein the at least one connector member does not include ridges, serrations, or teeth.

8. The method of claim 1, wherein the at least one connector member does not comprise a hollow interior.

9. The method of claim 1, wherein an external surface of the at least one connector member, relative to the thermally broken tubular extrusion, is substantially smooth.

10. The method of claim 1, wherein the thermally broken tubular extrusion is configured for coupling with one or more of a door, a window, or a curtain wall structure.

11. The method of claim 1, wherein the extrusion profiles are comprised of aluminum.

12. The method of claim 1, wherein the enlarged end portions of the at least one connector member have a greater cross-sectional width than the straight, elongate middle portion.

* * * * *